United States Patent
Davidson et al.

(10) Patent No.: US 10,643,645 B2
(45) Date of Patent: May 5, 2020

(54) SLIDER WITH BONDABLE SURFACE OPPOSITE SUSPENSION TRACE

(71) Applicant: Seagate Technology LLC, Cupertino, CA (US)

(72) Inventors: Paul Davidson, Eden Prairie, MN (US); Scott Damon Matzke, Shakopee, MN (US); Christopher Unger, Chanhassen, MN (US); Aaron Collins, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/139,590

(22) Filed: Sep. 24, 2018

(65) Prior Publication Data

US 2020/0098388 A1 Mar. 26, 2020

(51) Int. Cl.
G11B 5/48 (2006.01)
(52) U.S. Cl.
CPC .......... *G11B 5/4853* (2013.01); *G11B 5/4826* (2013.01)
(58) Field of Classification Search
CPC ........ G11B 5/48; G11B 5/4853; G11B 5/5426
See application file for complete search history.

(56) References Cited

U.S. PATENT DOCUMENTS

| | | | |
|---|---|---|---|
| 5,610,783 A | 3/1997 | Maffitt et al. | |
| 5,774,975 A | 7/1998 | Maffitt et al. | |
| 5,821,494 A * | 10/1998 | Albrecht | G11B 5/4853 219/121.64 |
| 6,336,581 B1 | 1/2002 | Tuchiya et al. | |
| 6,985,332 B1 * | 1/2006 | Sluzewski | G11B 5/3103 360/234.5 |
| 7,006,330 B1 * | 2/2006 | Subrahmanyam | G11B 5/4826 360/234.5 |
| 7,205,661 B2 | 4/2007 | Wark et al. | |
| 7,254,885 B2 | 8/2007 | Hipwell, Jr. et al. | |
| 7,952,833 B2 | 5/2011 | Smith | |
| 8,259,415 B2 | 9/2012 | Hutchinson et al. | |
| 8,587,901 B1 * | 11/2013 | Puttichaem | G11B 5/4826 360/234.5 |
| 8,730,621 B2 * | 5/2014 | Brandts | H01R 43/02 360/264.2 |
| 8,947,830 B1 * | 2/2015 | Collins | G11B 5/4853 360/234.5 |
| 8,995,091 B2 * | 3/2015 | Inoue | G11B 5/3163 360/123.1 |
| 9,013,963 B2 * | 4/2015 | Ver Meer | G11B 13/04 369/13.02 |
| 9,728,211 B1 * | 8/2017 | Murata | G11B 5/4826 |
| 9,786,308 B1 | 10/2017 | McNeill et al. | |
| 9,953,669 B1 | 4/2018 | Klarqvist et al. | |
| 2002/0186509 A1 * | 12/2002 | Nakagawa | G11B 5/105 360/250 |

(Continued)

*Primary Examiner* — Brian E Miller
(74) *Attorney, Agent, or Firm* — Westman, Champlin & Koehler, P.A.

(57) ABSTRACT

An apparatus includes a slider which includes a slider body with a leading edge and a trailing edge and a plurality of slider bond pads disposed at the trailing edge. The slider bond pads are configured to align opposite to suspension trace bond pads on a suspension to form a solderable gap between the slider bond pads and the suspension trace bond pads.

11 Claims, 8 Drawing Sheets

(56) References Cited

U.S. PATENT DOCUMENTS

| | | | |
|---|---|---|---|
| 2004/0070880 A1* | 4/2004 | Fu .................... | B24B 37/00 360/234.5 |
| 2005/0195529 A1* | 9/2005 | Tsuchida ............ | G11B 5/484 360/234.5 |
| 2005/0199680 A1* | 9/2005 | Matsumoto .......... | H05K 1/111 228/101 |
| 2006/0114610 A1 | 6/2006 | Krause et al. | |
| 2006/0139809 A1* | 6/2006 | Matsumoto .......... | G11B 5/4826 360/234.5 |
| 2006/0203388 A1* | 9/2006 | Burbank ............. | G11B 5/40 360/234.6 |
| 2007/0274005 A1* | 11/2007 | Zhu ................... | G11B 5/102 360/234.4 |
| 2008/0170326 A1* | 7/2008 | Feng .................. | G11B 5/4853 360/99.04 |
| 2009/0086374 A1* | 4/2009 | Smith ................ | G11B 5/4826 360/234.5 |
| 2010/0128394 A1* | 5/2010 | Limmer .............. | G11B 5/4826 360/234.3 |
| 2010/0214697 A1* | 8/2010 | Yao ................... | G11B 5/4853 360/246.2 |
| 2010/0321829 A1* | 12/2010 | Hutchinson ......... | G11B 5/4853 360/234.5 |
| 2013/0070369 A1* | 3/2013 | Chou ................. | G11B 5/4853 360/99.08 |
| 2013/0286803 A1* | 10/2013 | Shivarama .......... | G11B 13/04 369/13.32 |
| 2014/0198411 A1* | 7/2014 | Peng ................. | G11B 5/4826 360/234.5 |
| 2016/0184915 A1 | 6/2016 | Lo et al. | |
| 2016/0322072 A1 | 11/2016 | Puttichaem et al. | |
| 2017/0345447 A1* | 11/2017 | Dharachantra ...... | G01B 11/002 |

* cited by examiner

SLIDER WITH BONDABLE SURFACE OPPOSITE SUSPENSION TRACE

SUMMARY

In one embodiment, an apparatus is provided. The apparatus includes a slider which includes a slider body with a leading edge and a trailing edge and a plurality of slider bond pads disposed at the trailing edge. The slider bond pads are configured to align opposite to suspension trace bond pads on a suspension to form a solderable gap between the slider bond pads and the suspension trace bond pads.

In another embodiment, an apparatus includes a plurality of suspension trace bond pads on a suspension surface and a slider placed on the suspension surface. The slider includes a slider body including a leading edge and a trailing edge and a plurality of slider bond pads at the trailing edge. The slider bond pads are aligned with the suspension trace bond pads, with each slider bond pad aligned opposite to a corresponding suspension trace bond pad to comprise an opposing bond pair. The apparatus also includes a conductive material electrically coupling the slider bond pads to the suspension trace bond pads in a gap between each opposing bond pair.

In another embodiment, a method of forming an electrical interconnect between a slider and a suspension is provided. The method includes positioning a slider having a plurality of slider bond pads over a suspension having a plurality of suspension trace bond pads, with slider bond pads aligned opposite to the suspension trace bond pads, to form a solderable gap between each of the slider bond pads and each of the suspension trace bond pads. The method also includes forming a solder joint between each of the slider bond pads and the suspension trace bond pads by soldering the solderable gap.

Other features and benefits that characterize embodiments of the disclosure will be apparent upon reading the following detailed description and review of the associated drawings.

DETAILED DESCRIPTION OF ILLUSTRATIVE EMBODIMENTS

Although the present disclosure has been described with reference to embodiments, workers skilled in the art will recognize that changes may be made in form and detail without departing from the scope of the disclosure.

Recording heads progressively add more recording head features as technology advances. Recording head features use electrical interconnects to connect those features from slider bond pads to trace gimbal assembly (TGA) or suspension trace bond pads to connect with data storage device circuitry. As recording head features are added, the number of interconnects used to support those features increases as well.

To form an interconnect, a slider is placed on a suspension with suspension trace bond pads such that the slider bond pads are perpendicular to the suspension trace bond pads. A mechanical system may be used to jet solder spheres to connect the slider bond pads to the suspension trace bond pads in a thermal interconnect (TIC) process. The present disclosure generally describes a slider design with parallel or opposing bond bad interconnects. However, prior to providing additional details regarding the different embodiments, a description of an illustrative operating environment is provided below.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
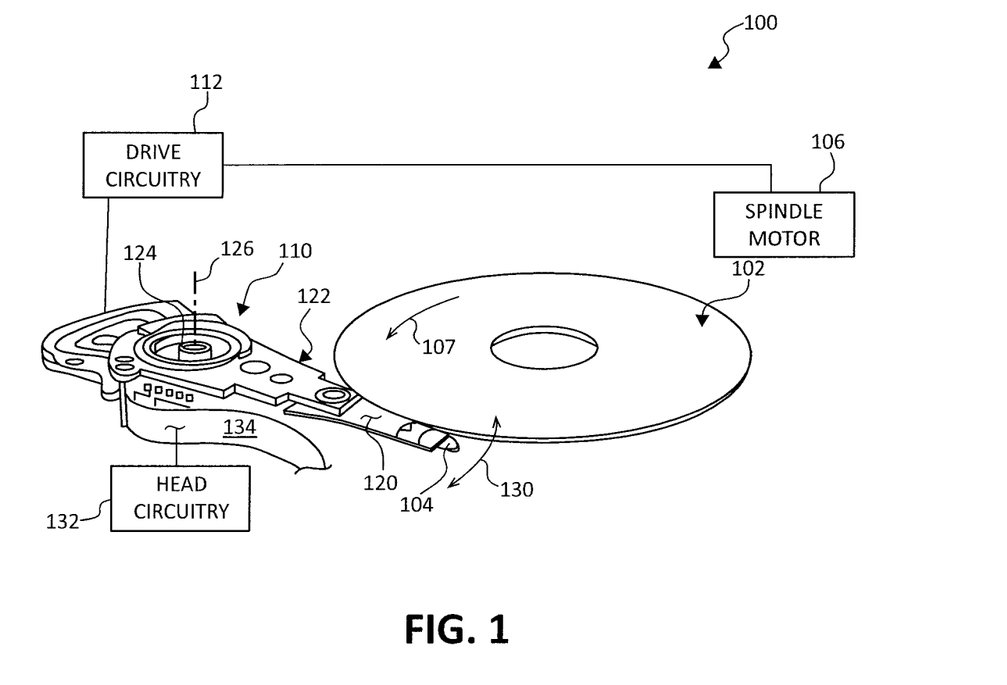
FIG. 1 illustrates an embodiment of a data storage device in which embodiments of the present application can be used.

FIG. 1 shows an illustrative operating environment in which certain slider interconnect embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. As shown in FIG. 1, the data storage device 100 includes a data storage medium or disc 102 and a head 104. The head 104 including transducer elements (not shown in FIG. 1) is positioned above the data storage medium 102 to read data from and/or write data to the data storage medium 102. In the embodiment shown, the data storage medium 102 is a rotatable disc or other storage medium that includes a storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection. The head 104 may include an opposing bond pad interconnect feature to connect to the head or slider to the suspension assembly according to embodiments of the present disclosure.

The transducer elements of the head 104 are coupled to signal processing circuitry or head circuitry 132 through flex circuit 134, also known as printed circuit cable assembly (PCCA), to encode and/or decode data to and from electrical signals. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is coupled to a frame or deck (not shown) through a bearing 124 to pivot about axis 126. Rotation of the actuator mechanism 110 moves the head 104 in an arc across the disc in approximately cross track directions as illustrated by arrow 130.

Figure 2:
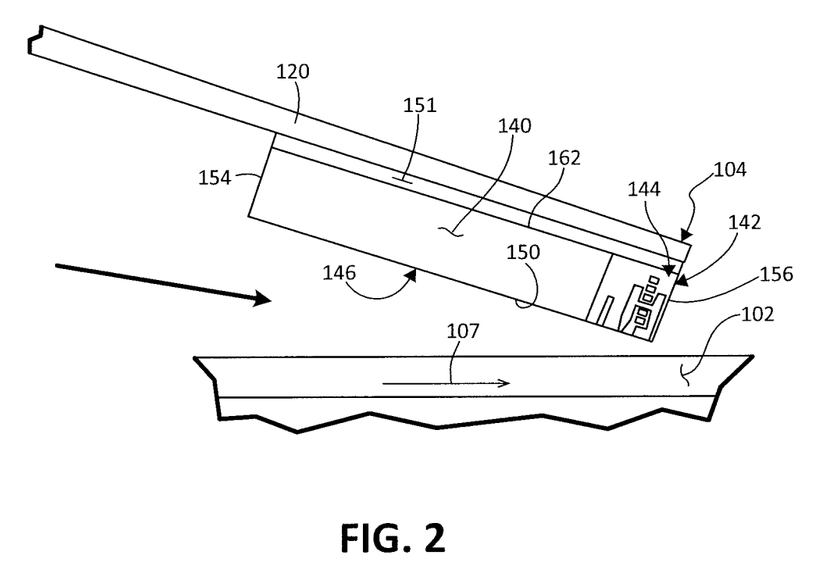
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown includes read and write elements encapsulated in an insulating structure to form a transducer assembly 144 of the head. As shown, the head 104 includes a bearing surface (for example, air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air or gas flow in direction 107 as shown in FIG. 2 along the bearing surface 146 of the slider 140 from a leading end or edge 154 to the trailing end or edge 156 of the slider 140 or head 104. The air or gas flow along the bearing surface 146 creates a pressure cushion to support the head 104 and slider 140 above the medium 102 for read and/or write operations. As shown, the transducer portion 142 is formed at or near the trailing edge 156 of the slider 140. It should be noted that a recording head such as 104 may include elements such as writer heaters, a reader heater, a thermal asperity sensor, etc., which are not shown in the interest of simplification.

Figure 3:
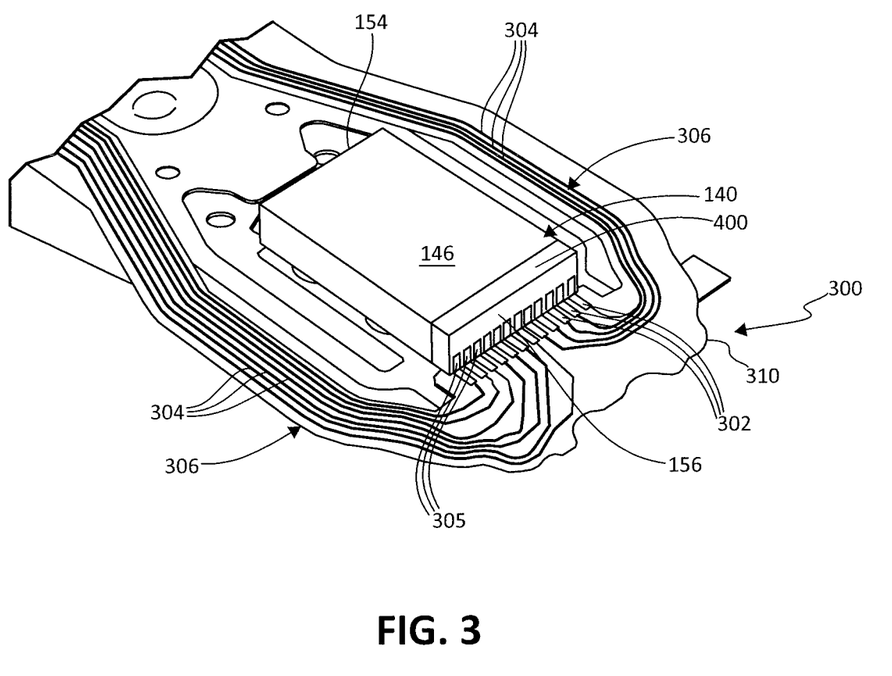
FIG. 3 is a diagrammatic illustration showing an interconnect portion providing an electrical interface to electrical elements of a recording head.

FIG. 3 is an embodiment showing an interconnect portion 300, also known as a TGA, providing an electrical interface to electrical elements of a recording head 104. In FIG. 3, slider 140 having a leading edge 154 and a trailing edge 156 is shown with its ABS 146 facing upwards. As can be seen in FIG. 3, the TGA 300 includes a plurality of suspension trace bond pads 302 on a suspension surface 310 coupled to the traces 304 along spaced gimbal arms 306 of a flex circuit extending along opposed sides of the slider 140 to electrically connect the transducer element(s) of the recording head 104 (e.g., transducer assembly 144 shown in FIG. 2) to the signal processing circuitry 132 (shown in FIG. 1). The interconnect portion 300 may include opposing bond pad interconnect features to connect the slider 146 to the suspension assembly according to embodiments of the present disclosure.

It should be noted that, instead of routing the flex circuit on opposite sides of the slider 140, the flex circuit may be routed between the slider 140 and the suspension load beam. In one embodiment, the traces 304 and bond pads 302 are formed of copper, gold, or other conductive material. Bond pads 302 connect to head or slider bond pads 305. Different schematic diagrams of slider-suspension trace bond pad connections in accordance with certain embodiments are shown in FIGS. 5-9 and described below.

A mechanical system or device is used to deposit conductive material, such as solder balls or solder spheres, to form the connection between slider bond pads and suspension trace bond pads. The mechanical system may store many solder spheres and is configured to send the solder spheres through a capillary tube to be deposited at a bond pad to form an interconnect. The solder sphere may then be heated to make the solder sphere reflow. The solder sphere is melted in this reflowing while in contact with a slider bond pad and its corresponding suspension trace bond pad. The reflowing results in both bond pads being wetted (e.g., the solder is molten and will adhere to the bond pads) which connects them together to form an interconnect.

As the density of bond pads on an interconnect increases, the cost and risk of defects during the interconnect process increases. Bond pads may be reduced in size (for example, pads may be 30 micrometers (μm) wide) and the spaces between the pads may be reduced (for example, spaces may be 23.75 μm wide) to create high density pads (for example, sliders with 11 bond pads or greater). To connect high density interconnects, smaller solder spheres (for example, approximately 40 μm wide) may be used, but there are limitations of using smaller solder spheres. Smaller solder spheres pose various operational challenges and the TIC process cost per head increases as solder sphere diameter decreases. Challenges for the mechanical system that deposits the solder spheres may include blocked chutes or capillaries; sheared off solder spheres, debris, or smears; or doubling of solder spheres. Capillaries may also need to be replaced with increased frequency and cost. Reducing the amount of solder and/or the space between bond pads also increases the risk of soldering defects. Interconnects with bond pads that are too close together or that use too little solder risk poor connections, cracks, or missed interconnects. Bond pads that are too close together also risk bridging, such that a bond is formed between adjacent bond pads.

Figure 4A:
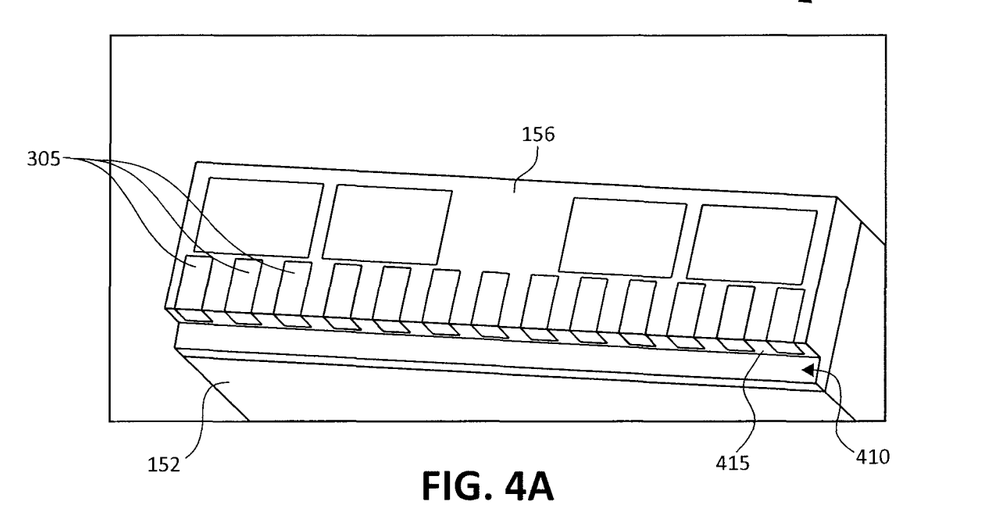
FIG. 4A is a diagrammatic illustration showing an interconnect portion of a slider according to embodiments of the present disclosure.

FIGS. 4A-4D illustrate an embodiment of the present disclosure with a slider 400 having slider bond pads 305 configured to align opposite to suspension trace bond pads. As can be seen in FIG. 4A, slider bond pads 305 are disposed on trailing edge 156 of the slider 400 which includes a cavity or recessed portion 410. Recessed portion 410 recedes into the body of slider 400 from trailing edge 156 such that an opposing bondable surface 415 (e.g., a surface which opposes the suspension trace) is formed. In this embodiment opposing bond surface 415 is formed from a bottom portion of slider bond pads 305 which are exposed towards the top surface 152 of the slider 400 (e.g., the surface which faces the suspension surface 310) thereby allowing the slider bond pads 305 to align opposite to the suspension trace bond pads 302. In this example, the slider bond pads 305 may be aligned parallel to the suspension trace bond pads 302.

Figure 4B:
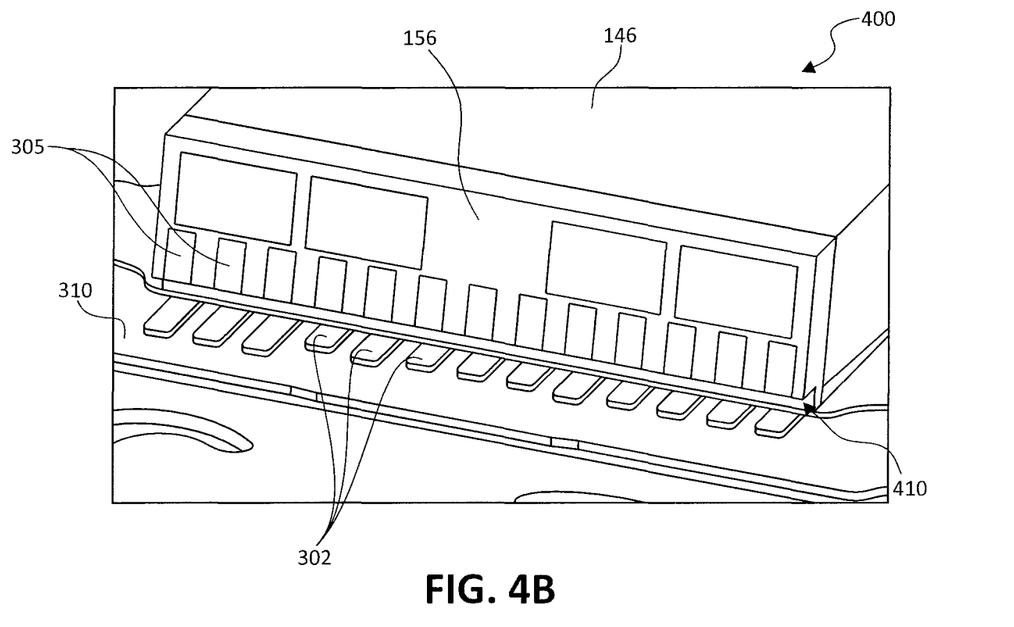
FIG. 4B is a diagrammatic illustration showing an interconnect portion of a slider and suspension according to embodiments of the present disclosure.

FIG. 4B illustrates slider 400 placed on suspension surface 310 prior to being electrically connected in an interconnect process. As can be seen, slider bond pads 305 on the trailing edge 156 are aligned with suspension trace bond pads 302 on the suspension surface 310. Recessed portion 410 forms a cavity or overhang on the trailing edge 156 such that the opposing bond surface 415 of the slider bond pads 305 are above the suspension trace bond pads 310 forming an open space or gap 405 therebetween. Each slider bond pad is thus configured to align with a corresponding suspension trace bond pad to form opposing bond pairs. In one example, the opposing bond pads are parallel to each other, however, the embodiments need not be so limited. One skilled in the art will recognize that various slider pad configurations may be utilized such that a gap 405 or cavity is formed between opposing bond pad surfaces.

Figure 4C:
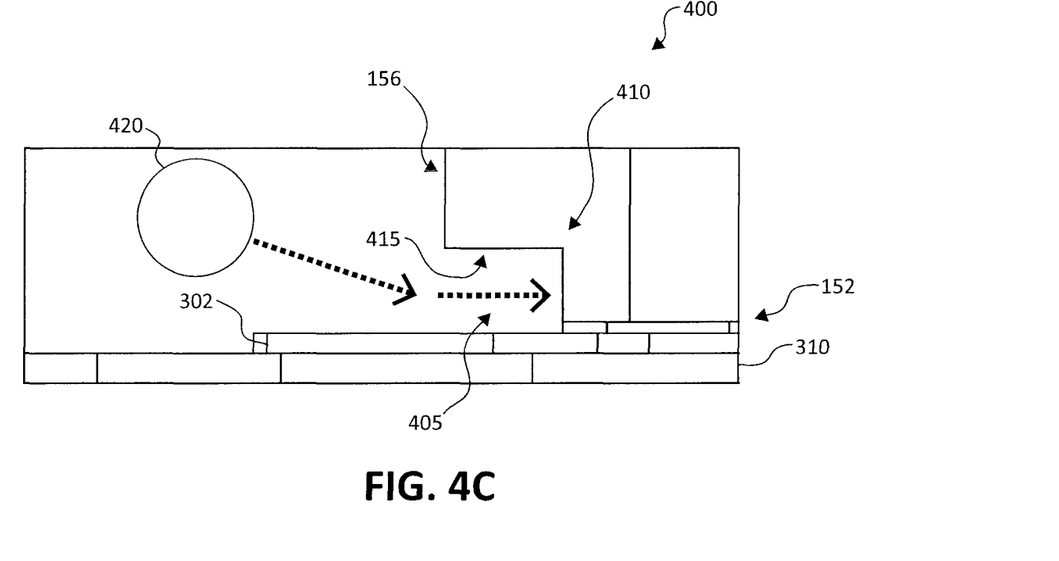
FIG. 4C is a diagrammatic illustration showing a side view of an interconnect portion of a slider and suspension according to embodiments of the present disclosure.
Figure 4D:
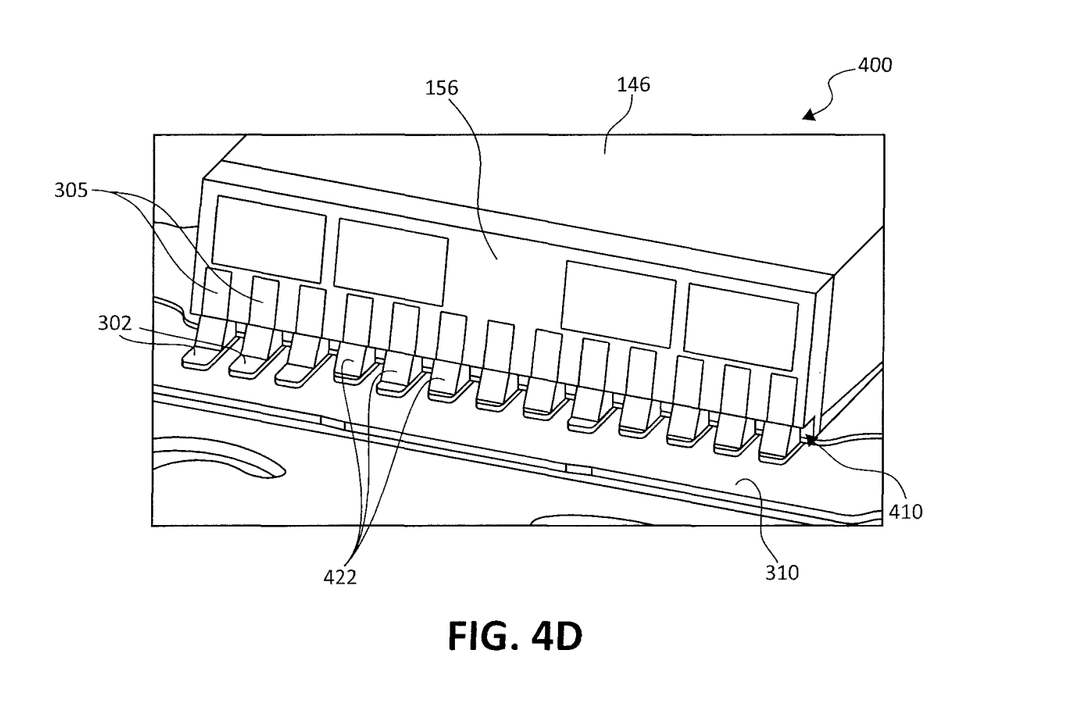
FIG. 4D is a diagrammatic illustration showing an interconnect portion of a slider and suspension according to embodiments of the present disclosure.

FIG. 4C illustrates a side view of slider 400 with opposing bond pads during a soldering process. As can be seen, slider 400 is positioned over suspension surface 310 and includes recess 410 forming a gap 405 between the opposable bonding surface 415 with slider bonding pads 305 (not shown in FIG. 4C) and suspension trace bond pads 302. A solder ball or solder sphere 420 may be used to form a joint or interconnect between slider bonding pads 305 and suspension trace bond pads 302. In one example, solder sphere 420 may utilize a fluxless solder or other industry standard materials. Solder sphere 420 may be targeted towards the gap 405 (e.g., by a mechanical system) as shown by arrow 425 to form joint or interconnect 422 (as seen in FIG. 4D) by soldering the gap 405 or cavity between opposing bond pairs (e.g., slider bond pads 305 and suspension trace bond pads 302). As the solder sphere 420 is targeted towards the gap 405 formed by recess 410, the solder sphere may be melted, allowing the opposing bond pads to be wetted. The interconnect process is further aided as the melted solder sphere may also be pulled into the gap between opposing bond pairs by capillary action. Opposing bond pairs have surfaces with low incident angles at solder impact surfaces (for example, the bond pads are parallel) and another aspect of using opposing bond pads is they may reduce the splat of the solder sphere 420 at impact during jetting.

FIG. 4D shows a front view of slider 400 after soldering the opposing bond pairs has been completed. The interconnect or joint 422 has been formed in the gap 405 between opposing bond pairs of slider bond pads 305 and suspension trace bond pads 302. Forming joint 422 or interconnect between opposing bond pairs, rather than perpendicular bond pairs, may allow a strong joint to be formed without an outward bulge toward adjacent bond pads. By reducing outward bulges, the risk of bridging between adjacent bond pads is decreased. Thus, utilizing opposing bond pads may allow for an increased interconnect density and reduces the limitations of using smaller solder spheres or the risk of defective joints.

Figure 5:
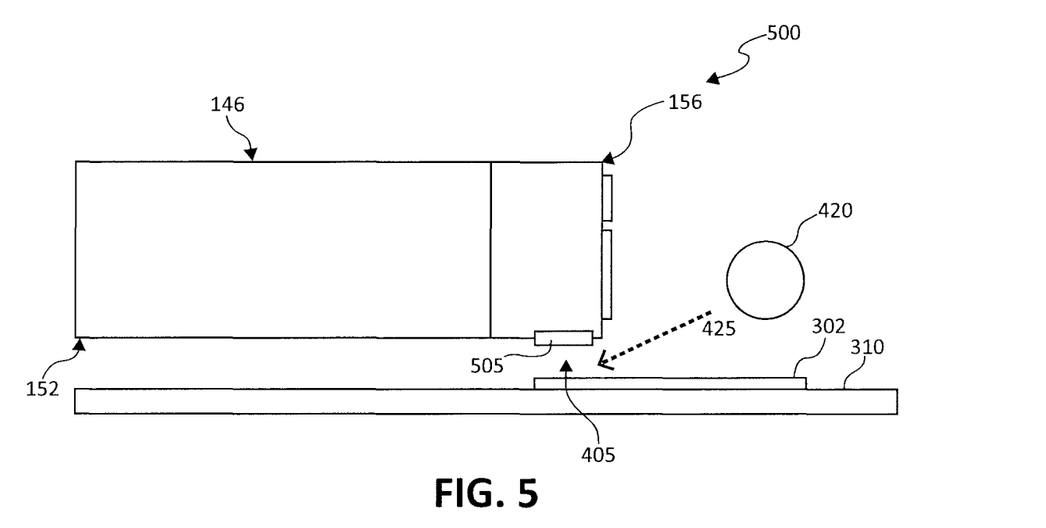
FIGS. 5-8 illustrate alternative embodiments for slider interconnects using opposing bond pads.

FIGS. 5-8 illustrate alternative embodiments for interconnects using opposing bond pads. It should be noted that the drawings have been simplified and are exemplary only, and some features (for example, features such as gimbal spring 151 or transducer assembly 144) have not been included in the drawings in order to illustrate embodiments of the present disclosure. FIG. 5 is an embodiment of slider 500 utilizing opposing bond pairs wherein the slider 500 does not include a notch or recess, such as recess 410. Here, an opposing bondable surface is provided as slider bond pad 505 is coupled to top surface 152 (e.g., the surface facing suspension 310) to form an opposing bond pair with suspension trace bond pad 302 on suspension surface 310. A joint or interconnect may be formed to slider bond pad 505 similarly to that described above in FIGS. 4A-4D, such that solder sphere 420 may be targeted (shown by arrow 425) towards the gap 405 between an opposing bond pair (e.g., slider bond pad 505 and suspension trace bond pad 302) to form an interconnect (e.g., joint 422 as seen in FIG. 4D) by soldering the gap 405 or cavity between the opposing bond pairs.

Figure 6:
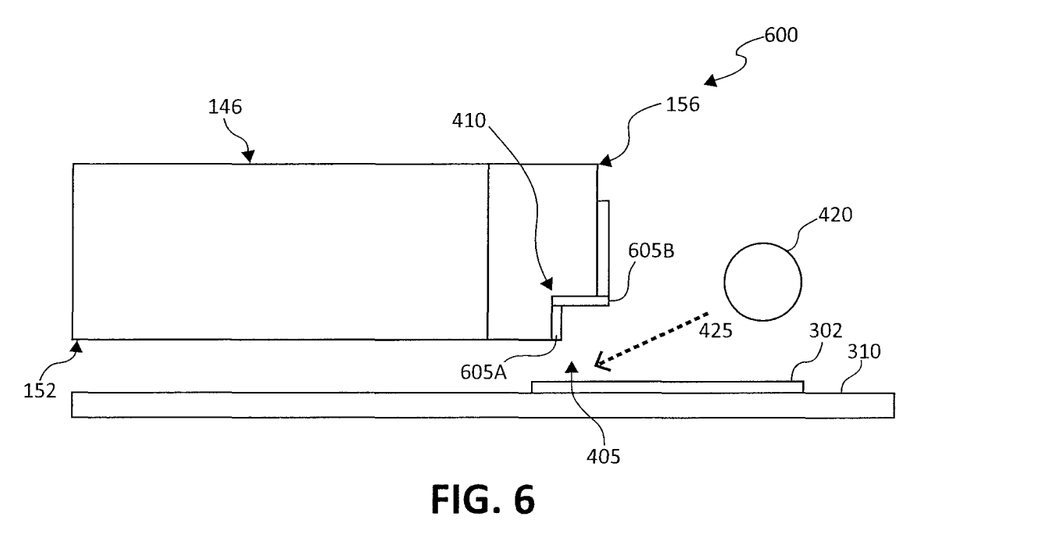

FIG. 6 illustrates an embodiment of a slider 600 utilizing opposing bond pairs wherein the slider 600 includes a notched surface for slider bond pads. Similar to slider 400, slider 600 includes a notched or recessed portion 410 which recedes into the body of slider 600 from trailing edge 156. Slider 600 forms slider bond pads 605 utilizing a wrapped metallization feature. The wrapped metallization feature includes a vertical bond pad 605A which is perpendicular to suspension trace bond pad 302, and a horizontal bond pad 605B which is opposite to suspension trace bond pad 302, coupled within recessed portion 410. A joint or interconnect may be formed such that solder sphere 420 may be targeted (shown by arrow 425) towards the gap 405 formed between the recess 410 and suspension trace pad 302 (e.g., the opposing bond pairs). Here, solder sphere 420 may bond vertical bond pad 605A and horizontal bond pad 605B to suspension trace bond pad 302 to form an interconnect (e.g., joint 422 as seen in FIG. 5D) by soldering the gap 405 or cavity between the opposing bond pairs.

Figure 7:
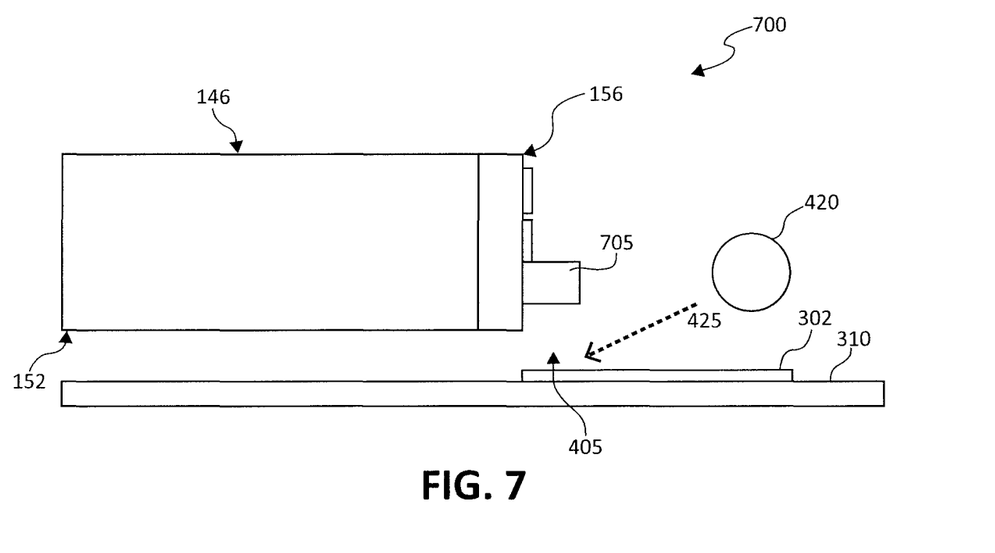

FIG. 7 illustrates an embodiment of a slider 700 utilizing a bondable protrusion to form an opposing slider bond pad. As can be seen, slider 700 includes a protruding bond pad 705 which extends from the trailing edge 156 to form a cavity or gap 405 between a bottom surface of protruding bond pad 705 (for example, a bottom surface similar to opposing bondable surface 415) and suspension trace bond pad 302. Solder sphere 420 may be used to bond the protruding bond pad 705 to suspension trace bond pad 302 form a connection (e.g., joint 422 as seen in FIG. 4D) by soldering the gap 405 between the opposing bond pairs.

Figure 8:
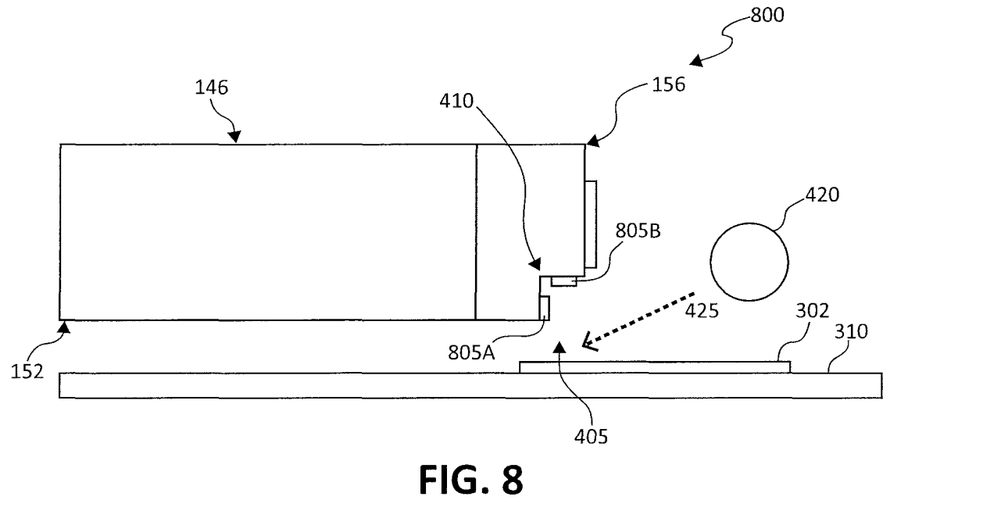

FIG. 8 illustrates an embodiment of a slider 800 utilizing opposing bond pairs wherein the slider 800 includes a notched surface for slider bond pads. Similar to slider 600, slider 800 includes a notched or recessed portion 410 which recedes into the body of slider 800 from trailing edge 156. Slider 800 forms slider bond pads 805 utilizing an island metallization feature. The island metallization feature includes a vertical bond pad 805A which is perpendicular to suspension trace bond pad 302, and a horizontal bond pad 805B which is opposite (e.g., parallel) to suspension trace bond pad 302, which are separated within the recessed portion 410. Solder sphere 420 may bond or connect vertical bond pad 805A and horizontal bond pad 805B to suspension trace bond pad 302 to form an interconnect (e.g., joint 422 as seen in FIG. 4D) by soldering the gap 405 or cavity between opposing bond pairs.

It should be noted that although materials such as copper, gold, or other conductive material have been discussed, the materials need not be so limited. Sliders and slider bond pads, and suspension assemblies and suspension trace bond pads may use industry standard materials or various other materials without departing from the scope of the disclosure.

Figure 9:
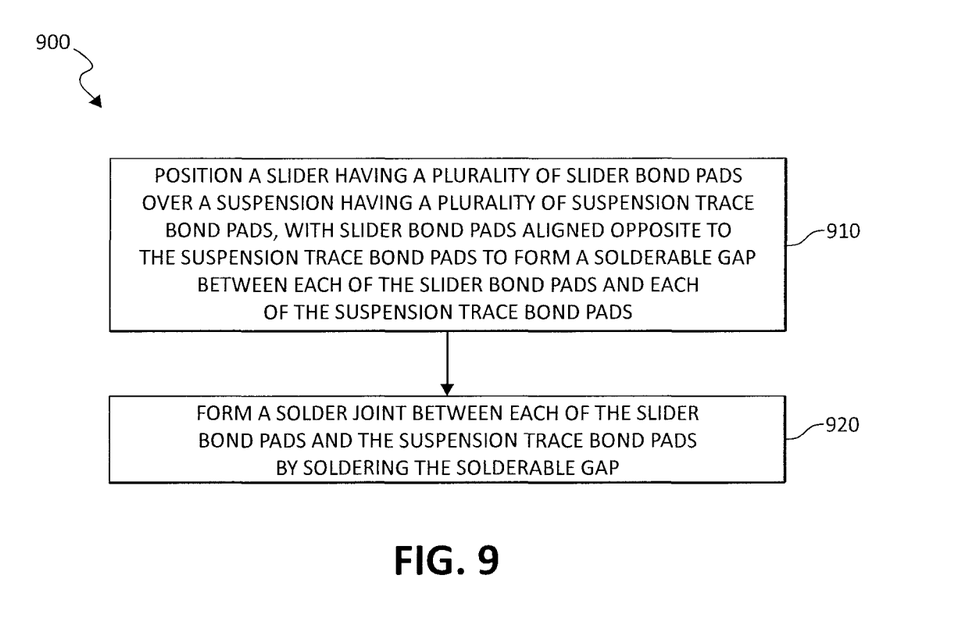
FIG. 9 is a flow diagram illustrating a method of making an interconnect between a slider and suspension according to an embodiment of the present disclosure.

FIG. 9 is a flow diagram illustrating a method 900 of forming an electrical interconnect between a slider and suspension. The method includes positioning 910 a slider (e.g., slider 400) having a plurality of slider bond pads (e.g., slider bond pads 305) on a suspension having a plurality of suspension trace bond pads (e.g., suspension trace bond pads 302), with slider bond pads aligned opposite to the suspension trace bond pads to form a solderable gap (e.g., solderable gap 405) between each of the slider bond pads and each of the suspension trace bond pads. The method also includes forming 920 a solder joint (e.g., solder joint 422) between each of the slider bond pads and the suspension trace bond pads by soldering the solderable gap. One aspect of the method may include targeting the solderable gap with a solder sphere to form the solder joint. Another aspect of the method may include the solder sphere being pulled into the solderable gap, such as by capillary action.

The illustrations of the embodiments described herein are intended to provide a general understanding of the method of the various embodiments. The illustrations are not intended to serve as a complete description of all of the elements and features of methods and systems described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, although a slider with bond pads on a trailing edge have been discussed herein, the embodiments need not be so limited, and opposing bondable surfaces may be used to form conductive interconnects in various designs and applications without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. An apparatus comprising:
   a slider comprising:
      a slider body comprising a leading edge and a trailing edge; and
      a plurality of slider bond pads disposed proximate to or at the trailing edge, wherein the slider bond pads are aligned facing and opposed to suspension trace bond pads on a suspension to form a solderable gap between the slider bond pads and the suspension trace bond pads, the solderable gap comprising a recessed portion in the slider body that is open at the trailing edge.

2. The apparatus of claim 1, and wherein the slider bond pads and the suspension trace bond pads form opposing bond pairs comprising solder impact surfaces.

3. The apparatus of claim 1, and further comprising solder material in the solderable gap, wherein the slider bond pads and the suspension trace bond pads are connected by the solder material in the solderable gap.

4. The apparatus of claim 1, and wherein each of the slider bond pads further comprise wrapped metallization which covers the recessed portion with a vertical bond pad connected with a horizontal bond pad.

5. The apparatus of claim 1, and wherein each of the slider bond pads further comprise island metallization which covers the recessed portion with a vertical bond pad separate from a horizontal bond pad.

6. An apparatus comprising:
   a plurality of suspension trace bond pads on a suspension surface;
   a slider placed over the suspension surface, the slider comprising:
      a slider body comprising a leading edge, a trailing edge and a recessed portion that forms a gap between the slider body and the suspension surface, the gap having an opening at the trailing edge;
      a plurality of slider bond pads proximate to or at the trailing edge, the slider bond pads aligned with the suspension trace bond pads, with each slider bond pad aligned opposite to and facing a corresponding suspension trace bond pad to provide an opposing bond pair.

7. The apparatus of claim 6, and further comprising a conductive material in portions of the gap, the conductive material electrically coupling the slider bond pads to the suspension trace bond pads.

8. The apparatus of claim 7, and wherein each of the slider bond pads further comprise the opposing bond pad disposed on a horizontal surface of the recessed portion and a vertical bond pad on a vertical surface of the recessed portion.

9. A method of forming an electrical interconnect between a slider and a suspension comprising:
   connecting a slider having a plurality of slider bond pads to a suspension having a plurality of suspension trace bond pads, with slider bond pads aligned facing and opposed to the suspension trace bond pads to form a solderable gap between each of the slider bond pads and each of the suspension trace bond pads, the solderable gap initially having no solder material therein; and
   after the slider is connected to the suspension to form the solderable gap that initially has no solder material therein, forming a solder joint between each of the slider bond pads and the suspension trace bond pads by introducing the solder material into the solderable gap.

10. The method of claim 9, and further comprising targeting the solderable gap with a solder sphere to form the solder joint.

11. The method of claim 10, and wherein the solder sphere is pulled into the solderable gap.

\* \* \* \* \*